Nov. 27, 1956 W. E. LEWIS ET AL 2,772,341
ELECTRIC HEATING APPLIANCE
Filed Dec. 2, 1954 2 Sheets-Sheet 1
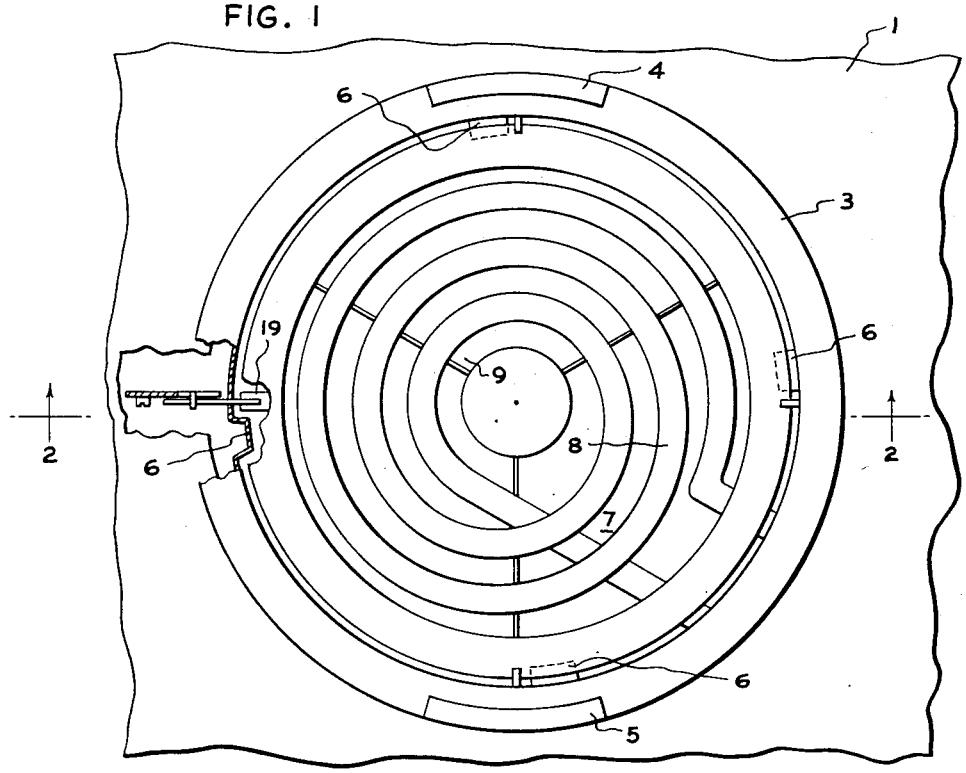
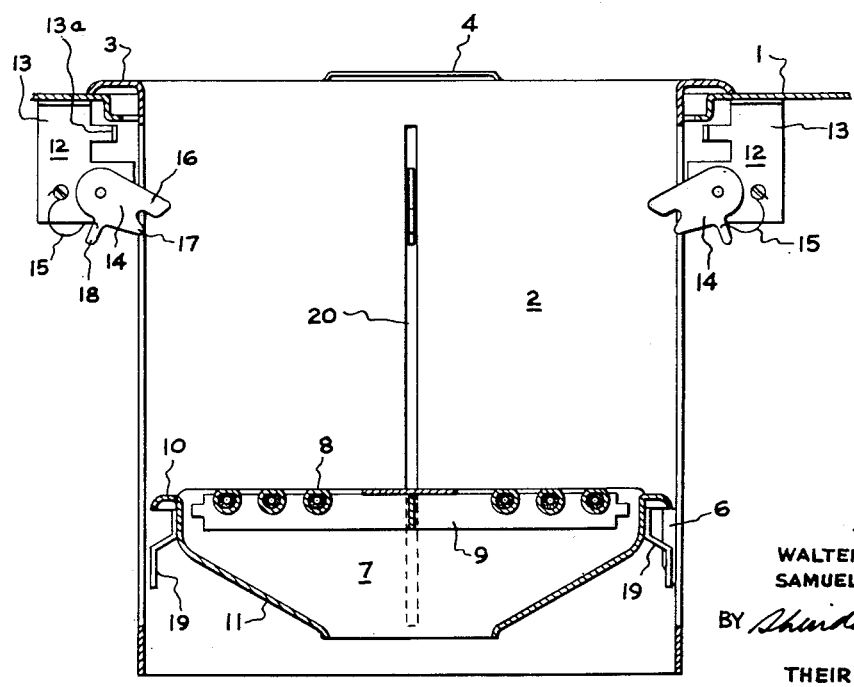
INVENTOR.
WALTER E. LEWIS &
SAMUEL C. JORDAN
THEIR ATTORNEY

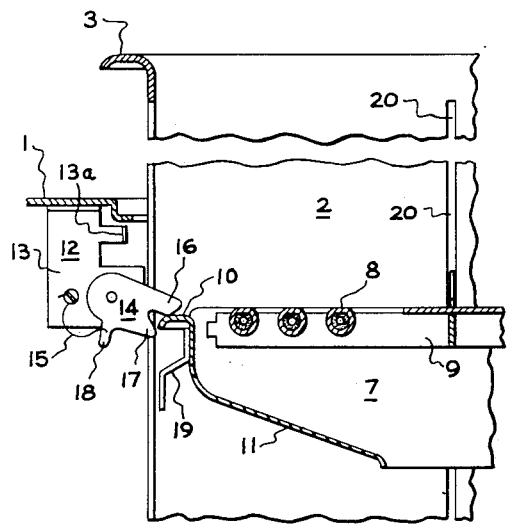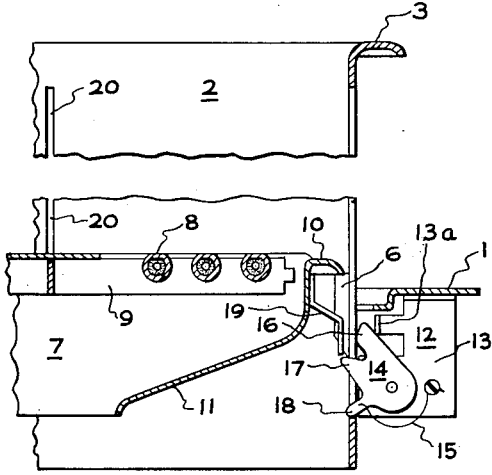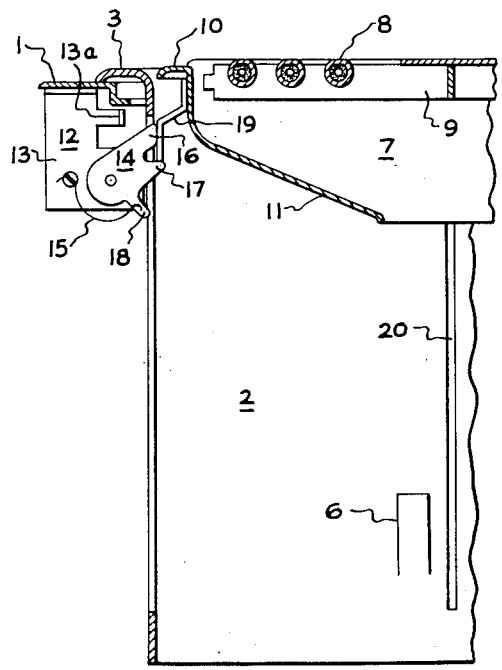

United States Patent Office 2,772,341
Patented Nov. 27, 1956

2,772,341

ELECTRIC HEATING APPLIANCE

Walter E. Lewis, Louisville, and Samuel C. Jordan, Lyndon, Ky., assignors to General Electric Company, a corporation of New York Application December 2, 1954, Serial No. 472,642

6 Claims. (Cl. 219—37)

This invention relates to electric heating appliances, and more particularly to a combined deep well cooker and surface unit.

Modern electric ranges are often provided with a deep well cooker arranged to also serve as a surface heating unit since it is a special purpose device which may not be used over considerable periods of time. Most commonly the heating unit of the cooker is adjustably mounted for manual movement between a lower position at the bottom of a well in the cooking top and an upper position substantially in the plane of the cooking top. However a disadvantage of certain arrangements of this type is that the heating unit cannot be moved from one position to the other while it is hot without danger of serious burns.

Accordingly, a principal object of the present invention is to provide a combined deep well cooker and surface heating unit in which the heating unit may be shifted from its upper position to its lower position or vice versa without touching the heating unit itself.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention we provide a tubular shell vertically arranged in an opening in the range cooking top, a heating unit horizontally arranged in the shell, and latch mechanism adapted to be operated by vertical sliding movement of the shell for holding the heating unit substantially flush with the cooking top. Thus by providing conveniently located handles on the shell the heating unit may be moved between its upper and lower positions without touching any part of the unit.

For a better understanding of my invention reference may be made to the accompanying drawing in which:

Fig. 1 is a top plan view of a deep well cooker constructed in accordance with my invention, some of the parts being broken away to show structural details.

Fig. 2 is a sectional view taken along the line 2—2 in Fig. 1.

Fig. 3 is a fragmentary view similar to Fig. 2 but shows the parts as they appear while the heating unit is being raised to its upper position.

Fig. 4 is similar to Fig. 3 but shows the parts as they appear when the shell is raised to its uppermost position.

Fig. 5 is similar to Fig. 3 but shows the parts as they appear when the beating unit is latched in its upper position.

Referring now to the drawings and more particularly to Fig. 1, there is illustrated a horizontal wall or cooking top 1 of an electric range or the like having an opening therein which is preferably cylindrical in form. Arranged within the opening in cooking top 1 is a tubular shell 2 having a cross sectional configuration similar to that of the opening and hence, in the illustrated embodiment, generally cylindrical. Shell 2 is provided with means for supporting it in the opening so as to form a deep well cooking chamber, and for this purpose a flange 3 is formed on the upper end thereof and arranged to rest on the cooking top. To facilitate raising and lowering shell 2 between the positions shown in Figs. 2 and 4, flange 3 is provided with handle portions 4 and 5.

To support a heating unit near the lower end of shell 2 we provide projections or bosses 6 projecting from the inner surface of the shell on which a heating unit generally designated by the numeral 7 rests. While any type of heating unit having a horizontal heating surface may be utilized, we have shown a unit having a sheathed resistance wire element 8 coiled in a flat spiral and resting on a spider frame 9, the three ends of which engage a flange ring 10. As illustrated in the drawings a drip pan 11 may be formed integrally with ring 10. It will be noted that heating unit 7 is freely movable within shell 2 and that its flange 10 simply rests on bosses 6.

Referring now to the latching mechanism for supporting heating unit 7 in its raised position substantially in the plane of cooking top 1, we have provided four latch members 12 mounted on the bottom surface of cooking top 1 and equally spaced around the edge of the opening therein. Each of the latch members 12 includes a bracket 13 suitably secured to cooking top 1 as shown, or to frame structure associated with the cooking top. Each latch bracket 13 includes a stop element 13a and supports a pivotally mounted arm 14 arranged to pivot about an axis parallel to the cooking top. Arm 14 is biased to the position shown in Fig. 2 by a suitable spring such as spring 15, which is secured at one end to a portion of arm 14 and at its other end to bracket 12. The arm is formed with three projecting fingers 16, 17 and 18, at least one of which projects through shell 2 (depending upon the position of arm 14) and into cooperative engagement with one of a plurality of supporting members 19 fixedly secured to heating unit 7. Each of the supports 19 includes a vertical surface facing the adjacent surface of shell 2 and a horizontal bottom surface which cooperate with fingers 16 and 17 respectively as hereinafter explained. Each arm 14 projects through a vertical slot in shell 2, it being noted that the upper ends of slots 20 terminate below the upper end of the shell and the lower ends of the slots terminate above the lower end of the shell. Thus since each of supports 19 is in vertical alignment with one of the arms 14 projecting through a slot 20, heating unit 7 and supports 19 may be raised into engagement with latch arms 14 by upward movement of shell 2.

The manner in which heating unit 7 may be raised so as to function as a surface unit or lowered so as to function as a deep well heating unit will not be described. As shown in Fig. 2 heating unit 7 simply rests on bosses 6 formed on the inner surface of shell 2 which in turn is supported on cooking top 1 by flange 3 when the parts are arranged to form a deep well cooker. To raise the heating unit to a position generally flush with the cooking top, shell 2 is raised by grasping handles 4 and 5 to the position shown in Fig. 3, in which flange 10 of heating unit 7 engages finger 16 of pivoted arm 14, and is latched in its raised position by continued upward movement of shell 2 until arm 14 is pivoted counterclockwise (as viewed in Fig. 3) to the position shown in Fig. 5. In this latching position the bottom surface of supporting member 19 rests on finger 17 of the latch arm, while finger 16 bears against the vertical surface of support 19; thus pivotal movement of arm 14 downwardly and away from support 19 is prevented, and the heating unit is supported in its raised position.

It will be observed that shell 2 is freely movable between its lower position in which flange 3 rests on cooking top 1 and its upper position in which the lower ends of slots 20 engage finger 18 of arm 14 as shown in Fig. 4. Thus when shell 2 is raised so as to lift heating unit 7 to its upper position it cannot be removed from the opening in the cooking top since the lower end of slot 20 strikes arm 18, and arm 14 is prevented from rotating further by engagement of finger 16 with stop element 13a.

When it is desired to lower heating unit 7 from the position shown in Fig. 5 to the deep well position shown in Fig. 2, shell 2 is again raised until bosses 6 engage flange 10 of the heating unit and raise it high enough to disengage supports 19 from latch arms 14, permitting the latch arms to pivot back to the position shown in Fig. 2 under the influence of spring 15. During this operation shell 2 is again prevented from being withdrawn completely out of the opening in the cooking top because its upward movement is stopped when the lower ends of slots 20 strike the lower edges of fingers 17. Further upward movement of shell 2 is prevented because arm 14 must pivot counterclockwise, as viewed in Fig. 5 to allow shell 2 to rise further, and such counterclockwise movement is prevented by engagement of finger 18 with the outer surface of the shell at a point below the end of slot 20. After heating unit 7 has been raised high enough to permit arms 14 to pivot back to the position shown in Fig. 2, both the heating unit and shell 2 may be lowered by gravity to the deep well position, arm 14 being pivoted out of the path of support 19 as the lower surface of the support engages the inclined upper surface of finger 16.

While we have shown and described a particular embodiment of our invention, it will be evident to those skilled in the art that various changes and modifications may be made without departing from our invention in its broader aspects and we therefore aim in the appended claims to cover all such changes and modifications as fall within the true spirit and scope of our invention.

What we claim as our invention is:

1. An electric heating appliance comprising frame structure including a horizontal wall having an opening therein, a tubular shell vertically arranged in said opening, means for supporting said shell with its upper end lying substantially in the plane of said wall, a heating unit horizontally arranged in said shell, means for supporting said heating unit in said shell adjacent the lower end thereof, a plurality of vertical slots in said shell, a plurality of latch means mounted on said frame adjacent said wall, each of said latch means including a pivoted arm having its free end projecting through one of said slots in said shell, said pivoted arm being movable into latching engagement with said heating unit upon upward movement of said shell to a first predetermined position so as to engage said heating unit with said pivoted arm, and said pivoted arm being movable out of engagement with said heating unit upon upward movement of said shell to a second predetermined position, whereby said heating unit may be positioned either at the bottom of said shell or substantially in the plane of said wall by vertical movement of said shell.

2. An electirc heating appliance as defined in claim 1 wherein said heating unit includes a plurality of support members each located so as to be engageable with one of said pivoted arms, each pivoted arm being movable by the support member engageable therewith into latching engagement with said support member upon upward movement of said shell to said first predetermined position.

3. An electric heating appliance as defined in claim 2 wherein said pivoted arm includes a first finger adapted to pivot under said member and engage the bottom surface thereof upon upward movement of said shell to said first predetermined position, and a second finger located above said first finger and engageable with a vertical surface of said member so as to hold said arm in latching engagement with said member.

4. An electric heating appliance as defined in claim 3 wherein a spring is connected to said pivoted arm so as to bias said arm into a position in which said second finger extends below the pivotal axis of said arm and into the path of movement of said member, whereby said arm is pivoted upwardly into latching engagement with said member upon upward movement of said shell and heating unit.

5. An electric heating appliance as defined in claim 4 wherein the lower ends of said slots terminate above the lower end of said shell and said arm includes a third finger located below said first finger, said third finger being arranged to project through said slot upon upward movement of said shell and said heating unit to a position in which said first finger is pivoted out of the path of movement of said member by engagement therewith, whereby said shell is retained in said opening by engagement of said third finger with the lower end of said slot.

6. A combination surface heating unit and deep well cooker for an electric range comprising a range cooking top, a cylindrical shell having a flange on one end thereof adapted to support the shell in an opening in said cooking top, a heating unit horizontally arranged in said shell, supporting means projecting from the inner surface of said shell for supporting said heating unit adjacent the lower end of the shell, a plurality of vertical slots in said shell, the upper ends of said slots terminating below the upper end of said shell and the lower ends of said slots terminating above the lower end of the shell, a plurality of latch members mounted on the bottom surface of said cooking top and arranged so that each is adjacent one of said slots, a plurality of support members secured to said heating unit and arranged so that each is in vertical alignment with one of said latch members, each of said support members having a vertical surface facing the adjacent surface of said shell and a horizontal bottom surface, each of said latch members including a pivotally mounted arm extending through the adjacent slot in said shell, said arm including first, second and third fingers adapted to project through said adjacent slot, said first finger being adapted to pivot under the cooperating support member in vertical alignment therewith and engage its bottom surface, said second finger being adapted to be engaged by said cooperating support member upon upward movement of said heating unit and to engage said vertical surface of said support member after being pivoted upwardly to a position in which said first finger engages said bottom surface of said support member, said third finger being located below said first finger and arranged to project through said adjacent slot only upon upward movement of said shell and heating unit to a position in which said first finger is pivoted out of the path of movement of said cooperating support member, whereby said heating unit may be raised into an upper position substantially in the plane of said cooking top by upward movement of said shell and supported in said upper position by engagement of said latch members with said support members or said heating unit may be released for movement from its upper position to its lower position by additional upward movement of said shell so as to disengage said latch members, and further upward movement of said shell is limited by engagement of said third fingers and the lower ends of said slots.

References Cited in the file of this patent

UNITED STATES PATENTS

| | | |
|---|---|---|
| 2,630,518 | Brehm | Mar. 3, 1953 |
| 2,664,493 | Weyrick | Dec. 29, 1953 |